April 20, 1954  D. GOLDMAN ET AL  2,675,617
RULER
Filed March 29, 1950
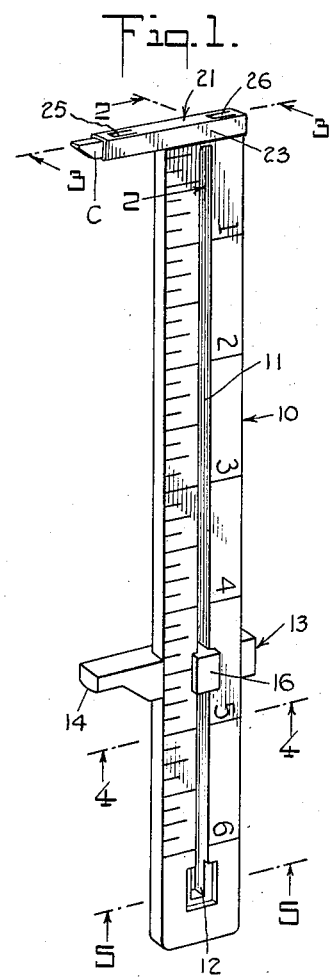
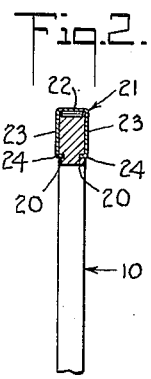
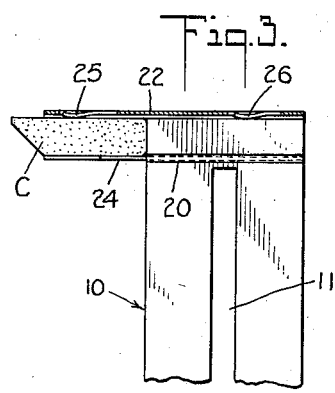
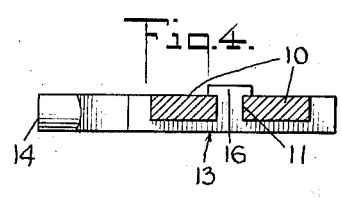
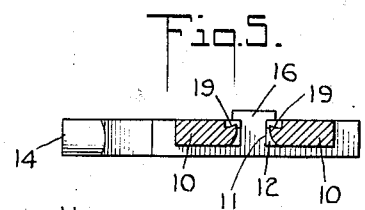
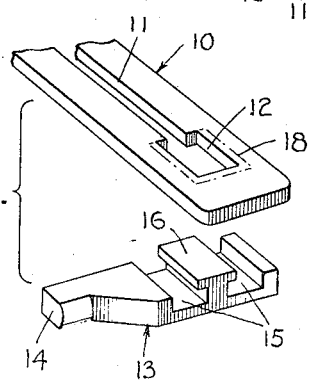
INVENTOR
David Goldman and
BY John Geiger
ATTORNEY

Patented Apr. 20, 1954

2,675,617

UNITED STATES PATENT OFFICE 2,675,617

RULER

David Goldman and John Geiger, Newark, N. J., assignors to Evans & Company, Newark, N. J., a corporation of New Jersey Application March 29, 1950, Serial No. 152,658

6 Claims. (Cl. 33—18)

This invention relates to a ruler of the type used by dressmakers, and comprises basically a measuring slide mounted on a base member.

A feature of our invention resides in the mounting of a chalk or crayon carrying member at one end of the ruler for co-action with the slide piece, the chalk or crayon being utilized to mark out on a garment or the like the distance between the end of the ruler and the slide piece, all as those skilled in the art will fully appreciate.

More particularly, it is a feature of our invention to utilize a metal ferrule that is readily applied, preferably without tools, to one end of the ruler, and so formed that it may carry therein a piece of chalk or crayon. Even more particularly, it is a feature of this part of the invention to utilize a ferrule slidably mounted on the ruler and adapted through the said sliding to manipulate the chalk carried thereby so as to move more or less of the chalk outwardly of the ferrule.

A further feature of the invention resides in the utilization of parts of the ferrule for holding the ferrule yieldingly against sliding movement relatively to the ruler. As still a further feature of this particular portion of the invention, we utilize means for yieldingly holding the chalk or crayon relatively to the ferrule against movement, except when desired.

A further feature of the invention resides in the mounting of the slide piece and its retention and assembly relatively to the ruler.

We have thus outlined rather broadly the more important features of our invention in order that the detailed description thereof that follows may be better understood, and in order that our contribution to the art may be better appreciated. There are, of course, additional features of our invention that will be described hereinafter and which will form the subject of the claims appended hereto. Those skilled in the art will appreciate that the conception on which our disclosure is based may readily be utilized as a basis for the designing of other structures for carrying out the several purposes of our invention. It is important, therefore, that the claims to be granted us shall be of sufficient breadth to prevent the appropriation of our invention by those skilled in the art.

Referring now to the drawings, Fig. 1 is a perspective view of a ruler embodying our invention. Fig. 2 is a section taken along lines 2—2 of Fig. 1. Fig. 3 is a section taken along lines 3—3 of Fig. 1. Figs. 4 and 5 are respectively sections taken along lines 4—4 and 5—5 of Fig. 1. Fig. 6 is a perspective view of a portion of the ruler and of the slide piece prior to the assembly of the slide piece on the ruler.

Referring now more particularly to the drawings, the ruler of our invention is designated generally by reference numeral 10 and is preferably formed of a plastic material, although other materials may readily be utilized as will occur immediately to those skilled in the art. The ruler 10 is formed with a longitudinal slot 11 that is enlarged at one end as indicated at 12. Cooperable with the slot 11 is a slide piece 13 having an indicating or measuring portion 14 at one end thereof. The slide piece 13 is further equipped with guideways 15 within which fit the opposed portions of the ruler 10 at each side of the slot 11, as best illustrated in Figs. 1 and 4. Extending upwardly between the guideways 15 is a lug 16 that serves, as best illustrated in Fig. 4, to hold the slide piece against separation in one direction from the ruler 10, the remainder of the slide piece acting to prevent separation in a reverse direction.

The slide piece 13 is assembled to the ruler 10 by the insertion thereof through the enlarged opening 12, this opening 12 being initially dimensioned to allow passage of the lug 16 upwardly therethrough. Once the lug 16 is brought upwardly through the opening 12, the walls of that opening are staked along the dash and dotted line 18 seen in Fig. 6, and when so staked are deformed as shown at 19 in Fig. 5. The deformed portions 19 coact with the lug 16 thereafter to prevent separation of the slide piece 13 even when it is moved relatively to the ruler into alignment with the opening 12. It will readily be appreciated that through the simple means we have thus disclosed, the slide piece 13 of our ruler is readily assembled thereto and is maintained assembled.

At one end of the ruler 10, and just beyond the end of the slot 11, each face, preferably, of the ruler is formed with a groove 20, as probably best illustrated in Fig. 2. A metal ferrule 21 is formed with an end wall 22 lying directly against the end surface of the ruler 10, and with side walls 23 lying against the opposed faces of the ruler 10. The walls 23 are formed with inwardly projecting flanges 24 adapted to enter the grooves 20. Since the ferrule 21 is preferably open at each end, although it may be closed at one end if desired, it may readily be moved transversely of the ruler 10 so that its flanges 24 will engage the grooves 20 to maintain the ferrule thereafter against endwise separation from the said ruler 10. However, the ferrule will still slide relatively to the ruler if such sliding is desired and necessary.

The ferrule 21 preferably is longer than the width of the ruler so that it projects beyond the ruler as is well shown in Figs. 1 and 3. Mounted within the projecting portion of the ferrule 21 is a piece of chalk or crayon "c" that is preferably held yieldingly against sliding relatively to the ferrule by a tongue 25 formed by a shearing of a part of the end wall 22 of the ferrule, all as best seen in Figs. 1 and 3. Preferably, an additional tongue 26 may be formed on the ferrule, this tongue acting to hold the ferrule yieldingly against sliding relatively to the ruler through the constant pressure of the tongue 26 against the end of the ruler.

It will further be appreciated that through the use of two tongues, a ferrule may be applied reversibly relative to the end of the ruler. It will still further be appreciated that the chalk or crayon "c" within the ferrule lies with one end thereof against the ruler so that sliding of the ferrule relatively to the ruler will act to project the chalk or crayon "c" outwardly of the ferrule. We have thus contributed a simple construction for holding a chalk or crayon relatively to one end of a ruler and adapted to manipulate the said chalk, all through the utilization of an extremely simple and economically manufactured structural means.

We now claim:

1. In a ruler of the class described, a ferrule for one end of said ruler, said ruler being transversely-grooved near its said one end and on each face, and opposed inwardly extending flanges on said ferrule engaging said grooves to hold said ferrule against endwise separation from said ruler, said ferrule being longer than the width of the ruler so as to extend therebeyond and form a container for chalk or the like.

2. In a ruler of the class described, a ferrule for one end of said ruler formed with an end wall to lie against the end surface of the ruler and side walls to lie against the faces of said ruler, said ruler being grooved near its said one end and on each face, opposed inwardly extending flanges on the side walls of said ferrule engaging said grooves to hold said ferrule against endwise separation from said ruler, and said ferrule being longer than the width of the ruler so as to extend therebeyond and form a container for chalk or the like.

3. In a ruler of the class described, a ferrule for one end of said ruler formed with an end wall to lie against the end surface of the ruler and side walls to lie against the faces of said ruler, means guiding said ferrule for sliding movement transversely of said ruler, and said ferrule being longer than the width of the ruler so that said walls extend therebeyond and form a container for chalk or the like with the end wall of said container being the body of the ruler, whereby said chalk is projected outwardly of the ferrule when said ferrule slides in one direction relatively to said ruler.

4. In a ruler of the class described, a ferrule for one end of said ruler formed with an end wall to lie against the end surface of the ruler and side walls to lie against the faces of said ruler, said ruler being grooved near its said one end and on each face, opposed inwardly extending flanges on the side walls of said ferrule engaging said grooves to hold said ferrule against endwise separation from said ruler, said ferrule being longer than the width of the ruler so as to extend therebeyond and form a container for chalk or the like, and a tongue punched from one of said walls for yieldingly holding the chalk in said ferrule against movement.

5. In a ruler of the class described, a ferrule for one end of said ruler formed with an end wall and side walls to lie against the faces of said ruler, means guiding said ferrule for sliding movement transversely of said ruler, and said ferrule being longer than the width of the ruler so that said walls extend therebeyond and form a container for chalk or the like.

6. In a ruler of the class described, a ferrule for one end of said ruler formed with an end wall and side walls, said side walls being adapted to lie against the faces of said ruler, said ruler being grooved near its said one end and on each face, opposed inwardly extending flanges on the side walls of said ferrule slidably engaging said grooves to hold said ferrule against endwise separation from said ruler while guiding said ferrule for sliding movement transversely of said ruler, and said ferrule being longer than the width of the ruler so that its walls extend beyond the ruler and form a container for chalk or the like.

References Cited in the file of this patent

UNITED STATES PATENTS

| Number | Name | Date |
|---|---|---|
| 416,719 | Curtis | Dec. 10, 1889 |
| 823,406 | Gastineau | June 12, 1906 |
| 972,936 | Smith | Oct. 18, 1910 |
| 1,009,214 | Backstrom | Nov. 21, 1911 |
| 1,288,556 | Gasstrom | Dec. 24, 1918 |
| 1,564,381 | Thorell | Dec. 8, 1925 |
| 1,594,255 | Goldsmith | July 27, 1926 |
| 1,676,951 | Hunt | July 10, 1928 |
| 1,907,772 | Fellowes | May 9, 1933 |
| 2,274,727 | Neiss et al. | Mar. 3, 1942 |
| 2,499,673 | Olejniczak | Mar. 7, 1950 |

FOREIGN PATENTS

| Number | Country | Date |
|---|---|---|
| 248,483 | Italy | May 22, 1926 |
| 302,209 | Great Britain | Dec. 12, 1928 |